Figure 1:
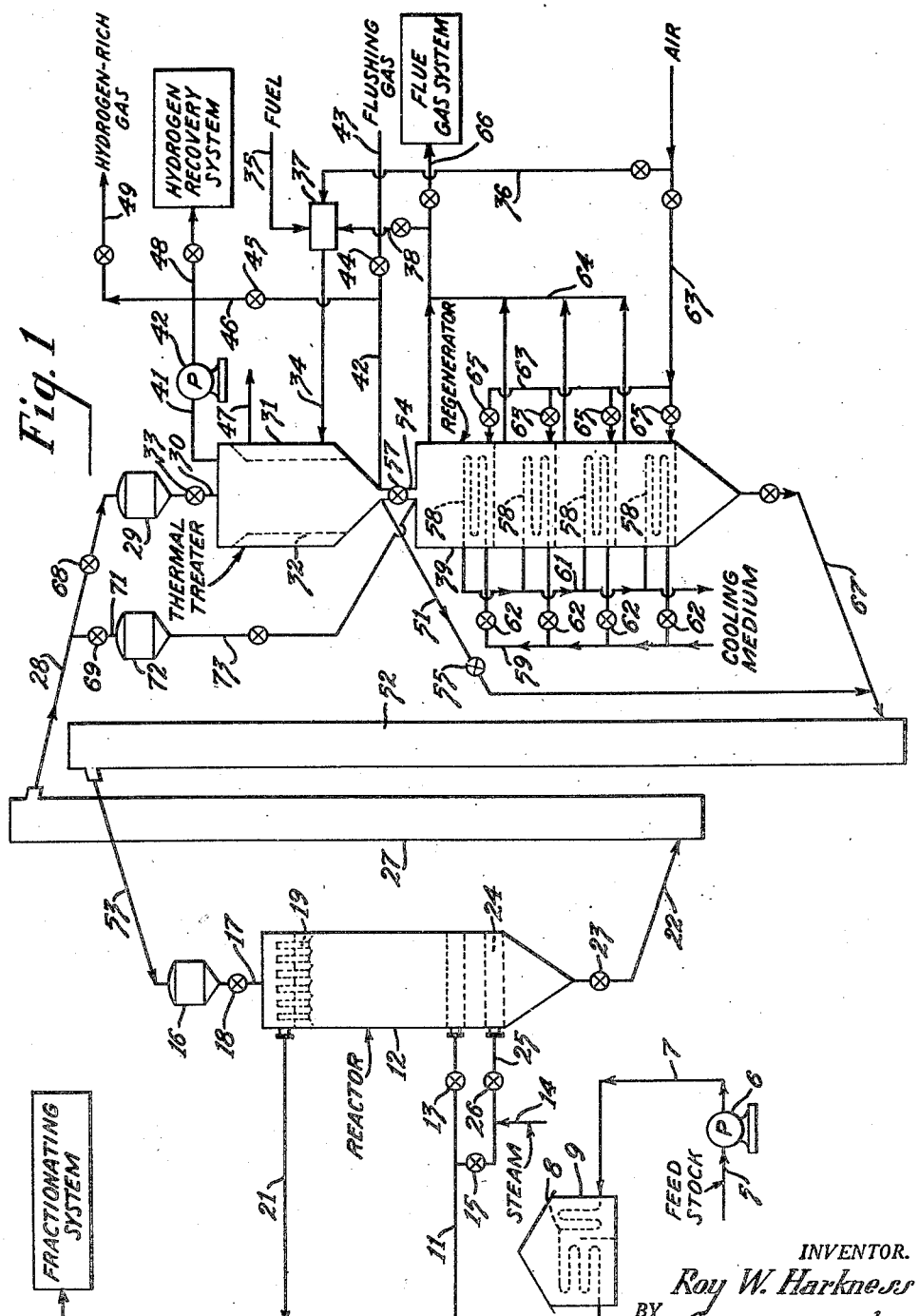

Aug. 28, 1951 R. W. HARKNESS 2,565,498
HYDROCARBON CONVERSION
Filed July 23, 1946 2 Sheets-Sheet 2

INVENTOR.
Roy W. Harkness
BY
ATTORNEY.

Patented Aug. 28, 1951

2,565,498

UNITED STATES PATENT OFFICE 2,565,498

HYDROCARBON CONVERSION

Roy W. Harkness, Miami, Fla., assignor to Houdry Process Corporation, Wilmington, Del., a corporation of Delaware Application July 23, 1946, Serial No. 685,618

14 Claims. (Cl. 196—52)

This invention relates to those catalytic conversions of hydrocarbons, in which the original hydrocarbons are converted to hydrocarbons of different weight or structure or both and in which the catalytic conversion is directed and accelerated by a refractory catalytic contact mass which concomitantly accumulates a hydrocarbonaceous deposit commonly known as coke. Since the accumulation of such a deposit on the contact mass diminishes its efficiency as a catalyst as the amount of the deposit increases, it is the common practice to subject the contact mass to alternate periods of conversion and regeneration, during which latter period the hydrocarbonaceous deposit on the contact mass is removed by combustion, (i. e., by contacting the contact mass with an oxygen-containing or oxidizing gas). After the regeneration period, the contact mass, which must be refractory, that is, possessing sufficient heat stability to stand the temperature of regeneration (generally about 950° to 1100° F.) without appreciable diminution in catalytic activity, is again used for the catalytic conversion of hydrocarbons.

The regeneration period necessary in the cycle of operations described above imposes certain limitations on the overall process since the regeneration must be performed under conditions which are not deleterious to the catalytic contact mass, and hence the processing capacity of catalytic conversion plants is often limited by their coke burning capacity. One of the limitations is due to the nature of the hydrocarbonaceous deposit which consists essentially of carbon and hydrogen, for example, the deposit may contain about 5 to 8 weight per cent of hydrogen and the remainder essentially carbon, this carbon and hydrogen being associated in the form of compounds which are of undetermined composition and which are non-volatile with steam stripping at temperatures of the order of 600 to 1000° F. Combustion of such a deposit produces flue gas which contains an amount of steam sufficient to lower gradually the efficiency of contact masses in commercial use when the combustion is effected at elevated temperatures, this effect being particularly noticeable at temperatures above 1200° F. As a consequence, commercial practice has generally limited the maximum temperature of regeneration to temperatures of the order of 1100° F. where this effect is less important, with a resultant limitation on the rapidity of the combustion. Moreover, the flue gases produced by the regeneration are eventually vented to the atmosphere, the regeneration operation thus affording little of value except the heat produced by combustion. In many conversion processes such as cracking, it has been found necessary to remove all but a small amount of the deposit (1% weight per cent or less based on the contact mass) in order to maintain the contact mass at an acceptable and profitable level of activity.

The present invention is concerned with improvements in catalytic conversion processes, the improvements particularly relating to methods of handling and treating contact masses containing hydrocarbonaceous deposits.

It has been discovered, in accordance with the present invention, that a refractory catalytic contact mass which has accumulated a hydrocarbonaceous deposit of the type described above can be restored to a relatively high level of catalytic activity by thermally treating such a contact mass containing at least a portion of said deposit in a substantially non-oxidizing atmosphere at elevated temperatures at which pyrolysis of the deposit occurs, especially temperatures of at least 1200° F., and below temperatures at which substantial thermal deactivation of the contact mass results. A particularly effective range of temperatures for such a pyrolysis of the deposit has been found to lie between 1200° F. and 1800° F. This thermal treatment, which may follow or precede a partial regeneration by combustion of deposit, effects pyrolysis of a minor portion of the hydrocarbonaceous deposit and a resultant evolution of hydrogen-rich gases. Such hydrogen-rich gases furnish a valuable source of hydrogen which can be effectively recovered from such gases by well known methods.

The thermal treatment of a contact mass comprising a hydrocarbonaceous deposit resulting from conversion of hydrocarbons at temperatures in the range of about 750 to about 1100° F., as for example, a cracking operation using a gas oil as charge stock, can be effected by heating the contact mass to a temperature above 1200° F., such as temperatures in the range of 1300° to 1700° F., by indirect heat exchange or by direct heat exchange with a gas having little, if any, oxidizing action. At temperatures of the order of 1300° F. the hydrocarbonaceous deposit on the contact mass thermally decomposes with moderate rapidity, the rapidity and extent of the decomposition increasing with temperature, and evolves gases composed predominantly of hydrogen but generally containing some methane and minor (usually less than 5 volume per cent)

amounts of higher boiling hydrocarbons. By this process, hydrogen-carbon ratio of the hydrocarbonaceous deposit is decreased and the total amount of the deposit is reduced, which reduction may be, for example, of the order of 5 to 10 weight per cent. When the thermally treated contact mass is again used for the catalytic conversion of hydrocarbons, it manifests a catalytic activity or efficiency which may be 50 to 95% higher than the catalytic activity of a similar contact mass comprising the same or even lesser amounts of a similar but untreated deposit. In general, it is preferred to separate the bulk of the hydrogen-rich gases from the contact mass prior to its subsequent contact with hydrocarbons in order to avoid any complications arising from the mixture of these materials or to avoid the possibility of an explosion if the contact mass is to be exposed in some subsequent step to an oxidizing atmosphere, but it is to be understood that in some applications of the invention the contact mass may be reused for the conversion of hydrocarbons without separating such gases thereby saving the expense involved in purging.

As stated above, a contact mass thermally treated by the method set forth above may be used, without further treatment, to convert hydrocarbons to desired products. Another embodiment involves burning off at least a portion of the carbon containing deposit by contact with an oxidizing gas thereby further increasing the catalytic activity of the contact mass. Thus, the contact mass may be used for several conversion periods, each conversion period being followed by a thermal treatment, with the result that the carbonaceous deposit increases progressively, after which the carbonaceous deposit is partially or wholly removed by combustion during a regeneration period. Alternatively, the contact mass may be used in a continuous cycle of operations which comprises a conversion period and a thermal treatment period; in which case, the progressive accumulation of the carbonaceous deposit to inefficient amounts, such as over 100 grams of deposit per liter of contact mass, is prevented by continuously withdrawing a portion of the contact mass used in the cycle, partially or wholly regenerating the portion withdrawn, and returning the regenerated contact mass to the cycle of operations. In general, it is preferred to effect only a partial regeneration of the contact mass (i. e., to remove only a part of the carbonaceous deposit) since the complete removal of the carbonaceous deposit is accomplished with proportionately greater difficulty. However, all of these regenerations may be performed with greater efficiency because of the lowered hydrogen content of the hydrocarbonaceous deposit after thermal treatment. Because of the lowered hydrogen content, combustion of a thermally treated hydrocarbonaceous deposit results in reduced amounts of steam in the flue gases. Since most contact masses which are in commercial use for the conversion of hydrocarbons under cracking conditions are increasingly steam sensitive with increasing temperature, as stated above, it is common practice to limit the maximum temperatures of regeneration in such operations to reduce or avoid the effect of steam in the flue gases. It is one of the advantages of the present invention that combustion of a thermally treated hydrocarbonaceous deposit on a catalytic contact mass, such as those comprising silica and alumina, can be effected at temperatures below those at which thermal deactivation of the contact mass is appreciable, such as temperatures above 1100° F. and as high as 1300° F., or, in the case of artificially produced cracking catalysts, as high as 1500° F., without major damage to the contact mass because of steam sensitivity even over long periods of exposure to the flue gases.

In another embodiment of the present invention, the thermal treatment of a refractory catalytic contact mass comprising a hydrocarbonaceous deposit is preceded by a partial combustion of the hydrocarbonaceous deposit. The heat evolved by the combustion may be used, wholly or in part, to heat the contact mass whose temperature may be thereby raised from the temperature of conversion to a higher temperature. The temperature of the contact mass may be increased to the temperature of thermal treatment by using only the heat of combustion of the hydrocarbonaceous deposit or by using the heat of combustion to increase the temperature of the contact mass to a temperature between that of the conversion and that of the thermal treatment and thereafter increasing the temperature of the contact mass to the temperature of thermal treatment by indirect heat exchange or by direct heat exchange with a hot non-oxidizing gas.

In order to understand the invention more fully, reference should be had to the drawings which illustrate two embodiments of the present invention, which invention is not, however, limited in scope thereto. The drawings are diagrammatic flow diagrams in which details of conventional auxiliary equipment have been omitted for clarity. In the drawings, Fig. 1 is a schematic flow diagram of a cracking process illustrating one embodiment of the present invention.

Figure 2:
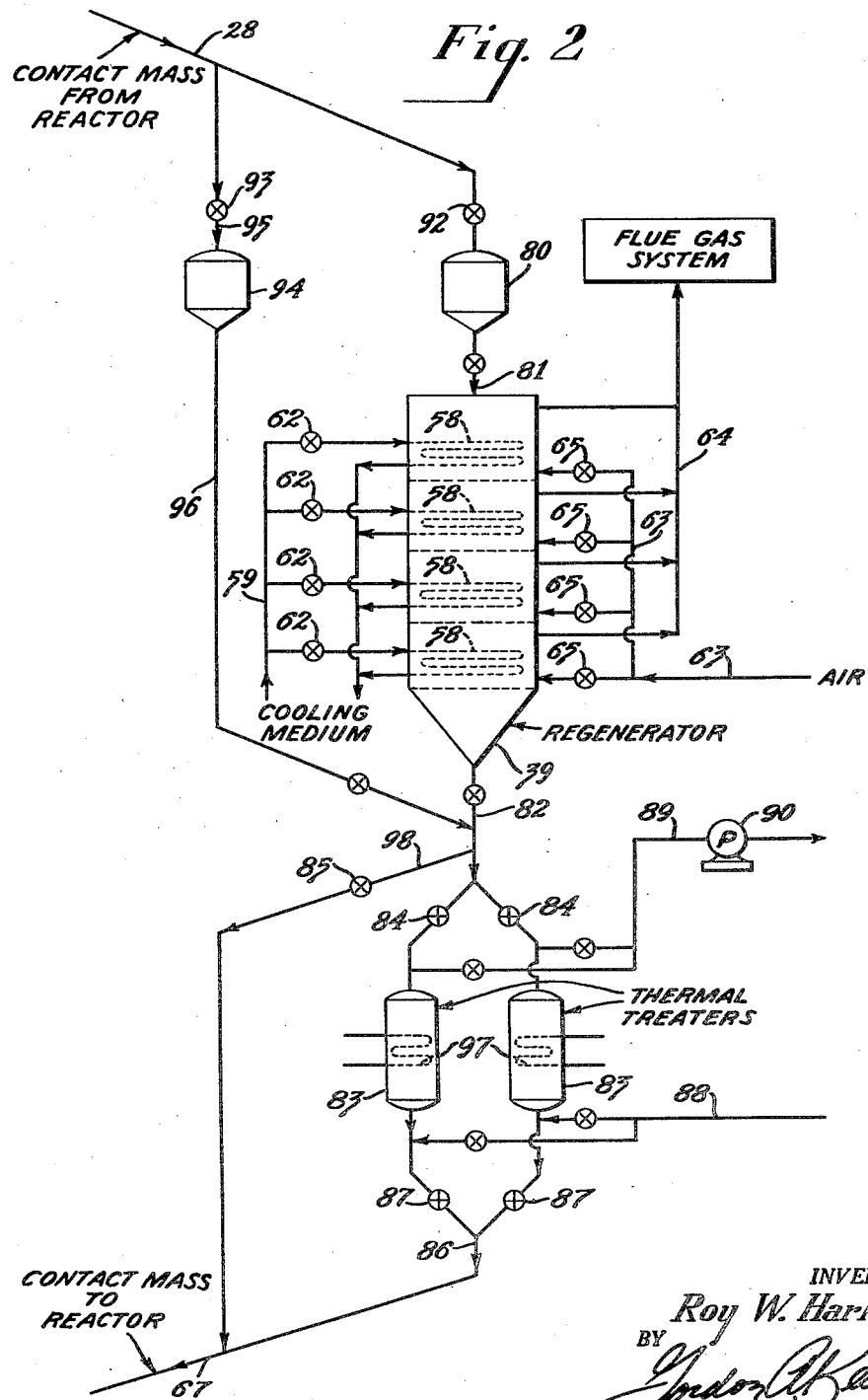

Fig. 2 is a portion of schematic flow diagram of a cracking process illustrating another embodiment of the present invention.

Both of the embodiments which have been exemplified in the drawings will be described in connection with operations in which a fluent refractory contact mass is cyclically circulated in a system known as the "T. C. C." system. Details of this system, as applied to cracking operations, have been described in various published articles (see, for example, "The T. C. C. catalytic cracking process for motor gasoline production" by R. H. Newton, G. S. Dunham and T. P. Simpson, Transactions of the American Institute of Chemical Engineers, volume 41, page 215, April 25, 1945 and the articles there cited) and hence will not be repeated here. Although the drawings exemplify one type of moving contact mass operation, the present invention can be embodied in other types of operations which use fluent solid contact masses or may be embodied in that type of operation known as fixed bed operation.

As shown in Fig. 1, a hydrocarbon feed stock, the nature of which will be described later is introduced through line 5 and is forced by pump 6 through line 7 to a heating coil 8 in furnace 9 and thence through line 11 to reactor 12, valve 13 being open. Steam from line 14 may be added to the feed stock after its passage through heating coil by opening valve 15. A refractory fluent contact mass having cracking activity flows from hopper 16 through leg 17, valve 18 being adjusted to give the desired flow, and passes downwardly as a moving bed through reactor 12. The contact mass thus contacts ascending hydrocarbon vapors introduced by line 11 under conversion conditions at elevated temperatures, which conditions are described more fully below, and thereby converts at least a portion of the hydrocarbon vapors into hydrocarbons of different molecular weight or structure or both. The mixture of converted and unconverted hydrocarbon vapors, commonly called the synthetic crude, is disengaged from the solid contact mass near the top of the reactor in a disengaging section 19 and is removed from the reactor through line 21. As indicated, the mixture of converted and unconverted hydrocarbon vapors are sent to a fractionating system for processing appropriate to the type of products desired. Such a fractionating system may comprise, when gasoline is the desired product, various coolers and/or heat exchangers, a separator to separate oil and water if steam has been used in the reactor, a fractionating column, debutanizing and/or depropanizing columns for stabilization, and other fractionating equipment for the recovery of light gases in various degrees of purity.

The contact mass moves downwardly in the reactor and is removed from the bottom of the reactor by line 22, the rate of flow of the contact mass through the reactor being adjusted by the valve 23. If desired, the contact mass may be purged, in purging section 24 of the reactor, of volatile hydrocarbon material prior to its removal from the reactor by admitting steam from line 25 in an amount regulated by valve 26. The contact mass removed from the reactor through line 22 is conveyed by an elevator 27 to a line 28 which communicates with hopper 29. The contact mass in hopper 29 has a hydrocarbonaceous deposit thereon as a result of its contact with the hydrocarbons in reactor 12.

The contact mass is fed from hopper 29 by leg 30 to thermal treater 31, the flow of contact mass being governed by valve 33. Thermal treater 31 comprises two coaxial noncommunicating cylindrical shells forming an annulus 32 into which are passed hot gases from line 34. These hot gases are obtained by burning a liquid or vaporous fuel from line 35 together with air from line 36 in burner 37. If desired, hot flue gases in line 38 from the regenerating kiln 39 may be substituted for any or all of the air in line 36 depending on the temperature and oxygen content of the flue gas. In any event, the gases are at such a temperature that the contact mass is heated to a temperature of over 1200° F. The contact mass in thermal treater 31 is preferably heated by indirect heat exchange to temperatures in the range of 1300 to 1650° F. and the hydrocarbonaceous deposit on the contact mass is thereby decomposed to hydrogen-rich gases which are removed from the solid by means of line 41. The hydrogen-rich gases are pumped by means of pump 42 to a hydrogen recovery system. A flushing gas may be introduced at the bottom of treater 31 by means of line 42. The flushing gas may be a substantially non-oxidizing gas, such as nitrogen, helium, or similar inert gas, and is introduced by line 43, valve 44 being open, and valve 45 being closed. If desired, the flushing gas in line 42 can be heated by indirect heat exchange with the hot gases in line 47 which gases have been used for heating in the thermal treater. Alternatively, a portion of the hydrogen-rich gas evolved in the treatment, may be used for direct heat exchange in which event a portion of the hydrogen-rich gas in line 41 is conveyed by line 46 to line 42 and heated therein, valve 44 being closed and valve 45 being regulated to feed the desired portion of hydrogen-rich gases to the treater.

All or a portion of the hydrogen-rich gas removed from the thermal treater may be conveyed by line 48 to a hydrogen recovery system which comprises appropriate equipment whereby the hydrogen content of the hydrogen-rich gases is increased. The hydrogen recovery system may employ, for example, processes utilizing the adsorption of methane and higher boiling hydrocarbons by liquid or solid adsorbents, or processes for the concentration of hydrogen by preferential diffusion or processes in which the hydrogen is concentrated by compression, liquefaction, and fractionation. In addition to physical methods, chemical treatment may be used to remove various gases under conditions such that the hydrogen present is unaffected. In another type of process, steam may be admixed with the hydrogen-rich gas in an amount equivalent to the methane present, the mixture passed over one or more catalysts such as a reducible oxide, for example, chromia on a refractory support, for example, magnesia, whereby the steam and methane are converted to hydrogen and carbon dioxide, the latter being removed by adsorption or chemical treatment. Alternatively, the hydrogen-rich gas may be removed by line 49 and used directly in processes where the presence of methane and higher boiling hydrocarbons or any flushing gas present is not detrimental.

All or a portion of the contact mass, after its passage through thermal treater 31, may be conveyed by line 51 to elevator 52 and thence conveyed by line 53 to hopper 16 from which it is charged to reactor 12, or it may be conducted by line 54 to a regenerator 39 in which all or a part of the carbonaceous deposit remaining on the solid catalyst is removed by combustion, the flow of contact mass in lines 51 and 54 being regulated by valves 55 and 57, respectively. When the contact mass passes by line 51 to elevator 52, it may be cooled to a temperature such that it will enter reactor 12 at the desired temperature for the cracking operation. Regenerator 39 may be the type known as a "Thermofor" kiln. The solid catalyst passes downwardly through the kiln through a series of sections each of which is equipped with cooling coils 58 through which cooling water or steam is passed by lines 59 and 61. The relative amount of cooling in each section may be controlled by valves 62. Air or a mixture of spent flue gas and air heated to an appropriate temperature is passed into various sections of the kiln by means of line 63, the amount of such air entering each section being regulated by valves 65. The spent flue gases from the combustion of the deposit on the contact mass are removed by line 64. The combined flue gases may be conducted by line 66 to appropriate equipment for the removal and recovery of any particles of contact mass contained in the flue gas. The contact mass, after passing through the various sections of the kiln, is removed by line 67 and thence conveyed to elevator 52 and line 53 to hopper 16 from which it is conveyed to the reactor 12 for use in the hydrocarbon conversion.

If desired, some of the contact mass may be passed through treater 31 while another portion is passed through the regenerator 39 without passing through the treater by adjusting valves 68 and 69 to allow a flow of part of the contact mass through line 71 to hopper 72 and thence by line 73 to regenerator 39.

In Fig. 2 is shown a partial flow diagram in which, in the interest of brevity, the reactor section, which can be the same as that of Fig. 1, has been omitted. Moreover, the general operation of regenerator 39 and its accessories has been described in connection with Fig. 1 and need not be repeated.

Contact mass from a reactor (not shown) is conveyed by line 28 to hopper 80 and thence passes by line 81 to regenerator 39. In regenerator 39, the contact mass is contacted with an oxidizing gas as described in connection with Fig. 1. As a result of the combustion of a portion of the hydrocarbonaceous deposit, heat is evolved and the temperature of the contact mass is increased, the amount of this increase in temperature being controlled by cooling coils 58. The heated contact mass is discharged from regenerator 39 by line 82 and is allowed to accumulate in one of the thermal treaters 83 by appropriate manipulation of valves 84 and 85.

While the contact mass is accumulating in one thermal treater, the other thermal treater is either being used for a static thermal treatment of the contact mass, appropriate valves 84 and 87 being closed, or is discharging contact mass previously treated thru line 86, the appropriate valve 87 being open. Contact mass from line 86 is conveyed by line 67 to the reactor system described in connection with Fig. 1. The contact mass may leave regenerator 39 substantially at the temperature of thermal treatment particularly if the thermal treatment is conducted at a temperature of the order of 1300° F., or the contact mass may leave the regenerator at a temperature such as 1100° F. and be heated to a higher temperature such as 1300° to 1500° F. in thermal treater 83. The contact mass may be heated by indirect heat exchange, as in Fig. 1, or hot inert gases introduced to the thermal treater by line 88 may be used for direct heat exchange. Evolved gases, together with any gases introduced by line 88, leave the thermal treater by line 89 and may be pumped by pump 90 to the other equipment.

In the event that the operation of regenerator 39 is interrupted, as by a mechanical breakdown, the flow of contact mass from the reactor in line 28 through the regenerator may be by-passed by closing valve 92 and opening valve 93, thus passing the contact mass to hopper 94 by line 95 and thence by line 96 directly to the thermal treaters 83. Thermal treatment of the contact mass in treaters 83 serves to restore, to a considerable extent, the catalytic activity of the contact mass which may then be used again in the reactor. Continued operation in this manner is limited by the accumulation of the hydrocarbonaceous deposit since the thermal treatment generally removes less than the amount deposited in a normal cracking operation but operation in this manner affords a method for continuous operation during a period in which the regenerator can be repaired. This method of operation may generally be continued effectively until the contact mass builds up a deposit containing of the order of 100 grams of carbon per liter of contact mass.

In some cases, where it is desirable to cool the contact mass following the thermal treatment, the thermal treaters 83 may be equipped with cooling coils 97 for this purpose. Alternatively, the contact mass may be discharged from regenerator 39 at a temperature lower than that of the thermal treatment, and a portion of it conveyed by line 98, valve 85 being properly adjusted, to line 67 where it is blended with contact mass from the thermal treatment, thus cooling the contact mass from the thermal treatment.

The processes exemplified in Figs. 1 and 2 may be used for various hydrocarbon conversions under cracking conditions. In this event, the feed stock may be a virgin or cracked gasoline which is contacted in the vapor phase with the contact mass to increase its octane number or lead susceptibility or decrease its sulfur content or acid heat without substantial change in boiling range; or the feed stock may be a hydrocarbon fraction boiling above the gasoline range, such as a naphtha, gas oil or a reduced crude, which is contacted in the vapor phase, steam being added where desirable for volatilization of the charge stock or mitigation of the severity of cracking, thereby producing either aviation or motor gasoline or lower boiling fractions having special properties, such as high aromatic content. Another type of operation may be used in which a feed stock, such as a deasphaltized crude residuum is contacted wholly or partially in the liquid phase with hot contact mass. In this event, and in other cases where it is advantageous, it is preferred to reverse the direction of flow of the hydrocarbons in the reactor shown in Fig. 1 and introduce the hydrocarbons at or near the top of reactor 12, the synthetic crude being removed at the bottom of the reactor.

The feed stocks, examples of which are described above, are contacted with the contact mass under cracking conditions. Cracking conditions are well known and include elevated temperatures laying generally in the range of 750° to 1100° F.; atmospheric and higher pressures in the range up to 100 pounds per square inch; ratios of the liquid volume of feed stock charged per hour to apparent volume of contact mass circulated per hour in the range of 0.1 to 10; amounts of added steam (present in the reactor) up to 25 weight per cent of the feed stock; and space velocities (ratio of the liquid volume of feed stock charged to reactor per hour to apparent volume of contact mass in reaction zone) in the range of 0.1 to 5.0.

The contact mass may consist of a single material or a blend of materials, one of which possesses catalytic cracking activity and the other of which possesses desirable heat capacity properties. The contact mass should have appreciable catalytic cracking activity (such as a "CAT-A" activity of 20 and preferably 30 or above, as defined by the test given in the article on a "Laboratory method for determining the activity of cracking catalysts" by J. Alexander and H. G. Shimp, "National Petroleum News," volume 36, No. 31, pages R-537-8, August 2, 1944). Contact masses adapted for use under cracking conditions are any of the familiar cracking catalysts such as natural siliceous clays, either raw or chemically treated where necessary, of the montmorillonite or kaolin type. Other contact masses adapted for use under cracking conditions are artificially produced siliceous contact masses of low alkali content, comprising colloidal mixtures of silica in admixture with one or more of the following materials; zirconia, alumina, urania, magnesia, thoria, beryllia and the like. Other artificially prepared contact masses such as the phosphates of zirconium, thorium, cerium and beryllium, either alone or in admixture, may be used in the processes described above.

Whatever type of contact mass is used, it is preferred that the maximum temperature to which the contact mass is subjected in either the thermal treatment or in the regeneration is below the temperature of thermal deactivation of the contact mass (i. e., the temperature at which the catalytic activity of the contact mass is rapidly impaired in the presence of the atmosphere characteristically and continuously present in the operation, such as air in the regeneration operation or hydrogen in the thermal treatment). Thus, for example, the temperature of thermal deactivation for raw or activated clay contact masses is generally about 1450° F. while artificially produced siliceous contact masses for cracking are deactivated at somewhat higher temperatures such as below 1700° F.

The above described processes may be exemplified by an operation in which an artificially prepared siliceous contact mass is used. Such a contact mass is prepared by precipitating a silica-alumina hydrogel in a basic menstruum, drying the hydrogel, removing, by base exchange, zeolitically held alkali from the gel thus prepared, drying the low-alkali gel, and calcining pellets molded from ground low-alkali gel. A siliceous contact mass thus prepared has a "CAT-A" activity of about 45 (i. e., about 45 volume per cent of 410° F. end point motor gasoline is formed, based on the light East Texas gas oil charged, at 800° F., space velocity of 1.5 volumes of oil per volume of contact mass per hour, 10 minutes conversion period) when the contact mass is freshly regenerated (i. e., has no significant hydrocarbonaceous deposit). After about 100 minutes of uninterrupted conversion under the conversion conditions of the "CAT-A" test, the contact mass produces only about 20 to 25 volume per cent of gasoline based on the charge stock in a 10 minute period, and accumulates, in about 120 minutes of such an operation, a deposit containing about 20 grams of carbon per liter of catalyst. After this contact mass is subjected to thermal treatment as described above at 1600° F. for 4 hours, and the gases evolved from the deposit are flushed out with nitrogen, the thermally treated contact mass has a "CAT-A" activity of 43.4, even though, as shown by a complete regeneration, the contact mass after the activity test comprises a deposit containing about 25 grams of carbon per liter of contact mass (about 4 weight per cent based on the contact mass).

In a similar operation, a contact mass of similar composition and preparation and having essentially the same activity, shows a CAT-A activity of 21 after having been used for the cracking of a light East Texas gas oil at 900° F. for 2 hours and having thereby accumulated a hydrocarbonaceous deposit containing about 30 grams of carbon per liter of contact mass. Thermal treatment of this contact mass at 1350° F. for 4 hours decomposes the hydrocarbonaceous deposit to produce a gas containing over 50 volume per cent hydrogen, exclusive of the helium used for flushing but leaves a deposit on the contact mass containing about 28 grams of carbon per liter of contact mass. The hydrogen in the separated gas is simply and effectively concentrated by the adsorption of contaminating gases, such as methane, on charcoal. The contact mass, after thermal treatment, has a "CAT-A" activity of about 40. Regeneration of the thermally treated contact mass, using air for combustion at temperatures of the order of 1400° F., to remove about half of the deposit and thus leave about 15 grams of carbon per liter of contact mass, restores the contact mass to essentially the same activity as it manifested when completely regenerated.

In another instance, a contact mass similar to the above described contact masses and having the same activity is contacted with a light East Texas gas oil at 15 pounds per square inch pressure and 880° F. for 15 minutes and concomitantly accumulates a hydrocarbonaceous deposit containing about 16 grams of carbon per liter of contact mass. This contact mass, which now has a "CAT-A" activity of about 33, is increased to a "CAT-A" activity of about 40 by subjecting it to a thermal treatment at 1350° F. for 4 hours. After thermal treatment, the contact mass is used in a cracking operation for a period of time sufficient to increase the deposit to 33 grams of carbon per liter of contact mass and then is subjected again to thermal treatment at 1600° F. The contact mass now has a "CAT-A" activity which is about the same as that after the first thermal treatment.

In general, it is preferred to operate so that the deposit on the contact mass contains less than 30 grams of carbon per liter of contact mass. Effective results in the catalytic conversion of hydrocarbons may be obtained when using contact masses having a deposit containing as much as 100 grams of carbon per liter of contact mass, particularly if the contact mass has an initial "CAT-A" activity of over 35 and preferably over 40 and the conditions of cracking are slightly more severe (higher temperature or pressure, or less added steam) than those used with the same contact mass having a deposit containing less than 6 grams of carbon per liter of contact mass. It is one of the advantages of the present invention that, by using contact masses having the above described amount of carbon-containing deposit, easily cracked charge stocks may be employed under conditions which would otherwise lead to severe over-cracking (i. e., formation of gas and coke at the expense of gasoline production.)

Although Figs. 1 and 2 have been described in terms of a cracking operation, the present invention includes other hydrocarbon conversion processes in which similar deposits accumulate on the contact mass. It is to be noted, however, the temperature of thermal treatment should not be higher than the temperature at which the contact mass is thermally deactivated for further hydrocarbon conversions. Among the processes included in the scope of the present invention are hydrogenation and dehydrogenation processes including dehydroaromization and cyclization processes, with or without added hydrogen, such as the catalytic reforming of naphthas, the production of toluene from n-heptane and methylcyclohexane, the production of aliphatic diolefins by dehydrogenation of more saturated aliphatic hydrocarbons, the production of hydroaromatics from the corresponding aromatics and the like. Other processes included are isomerization processes, polymerization processes and other relatively low temperature (220° to 700° F.) including liquid phase cracking operations, to produce hydrocarbons less volatile than gasoline. Any of the catalytic contact masses and the conditions of operation for such processes familiar to the art may be employed in connection with the present invention.

It is to be understood that when hydrocarbonaceous material is stated herein to be deposited on a contact mass as a result of contact with hydrocarbons that such material may be deposited on all surfaces available to gaseous contact by the hydrocarbons and thus material within a piece of a porous contact mass is included by such a statement.

Obviously many modifications and variations of the invention as hereinbefore set forth may be made without departing from the spirit and scope thereof and therefore only such limitations should be imposed as are indicated in the appended claims.

I claim as my invention:

1. In processes for the catalytic conversion of hydrocarbons wherein said hydrocarbons contact a refractory catalytic contact mass under conversion conditions and said contact mass concomitantly accumulates a hydrocarbonaceous deposit, which hydrocarbonaceous deposit substantially reduces the catalytic activity of said contact mass, the improvement which comprises substantially increasing the catalytic activity of said contact mass comprising said hydrocarbonaceous deposit by thermally decomposing at least a portion of said hydrocarbonaceous deposit in an atmosphere unreactive with said deposit at an elevated temperature below the deactivation temperature of said contact mass, and subsequently contacting hydrocarbons under conversion conditions with a refractory catalytic contact mass which comprises at least in part contact mass comprising substantially all of the hydrocarbonaceous deposit remaining thereon after said thermal decomposition.

2. The improvement of claim 1 in which the temperature of thermal decomposition is a temperature in the range of 1300° F. to 1700° F.

3. In processes for the catalytic conversion of hydrocarbons wherein said hydrocarbons contact a refractory catalytic contact mass under conversion conditions and said contact mass concomitantly accumulates a hydrocarbonaceous deposit, which hydrocarbonaceous deposit substantially reduces the catalytic activity of said contact mass, the improvement which comprises substantially increasing the catalytic activity of said contact mass comprising said hydrocarbonaceous deposit by thermally decomposing at least a portion of said hydrocarbonaceous deposit in an atmosphere unreactive with said deposit at an elevated temperature above 1200° F. and below the deactivation temperature of said contact mass, and contacting hydrocarbons under conversion conditions with said contact mass, which contact mass comprises substantially all of the hydrocarbonaceous deposit remaining thereon after said thermal decomposition.

4. In processes for the catalytic conversion of hydrocarbons wherein said hydrocarbons contact a refractory catalytic contact mass under conversion conditions and said contact mass concomitantly accumulates a hydrocarbonaceous deposit, which hydrocarbonaceous deposit substantially reduces the catalytic activity of said contact mass, the improvement which comprises purging said contact mass of hydrocarbons volatile with steam at temperatures between 600° and 1000° F., substantially increasing the catalytic activity of said contact mass comprising said hydrocarbonaceous deposit by thermally decomposing at least a portion of said hydrocarbonaceous deposit in an atmosphere unreactive with said deposit at an elevated temperature below the deactivation temperature of said contact mass, and subsequently contacting hydrocarbons under conversion conditions with said contact mass, which contact mass comprises substantially all of the hydrocarbonaceous deposit remaining thereon after said thermal decomposition.

5. In processes for the catalytic conversion of hydrocarbons wherein said hydrocarbons contact a refractory catalytic contact mass under conversion conditions and said contact mass concomitantly accumulates a hydrocarbonaceous deposit, which hydrocarbonaceous deposit substantially reduces the catalytic activity of said contact mass, the improvement which comprises substantially increasing the catalytic activity of at least a part of said contact mass comprising said hydrocarbonaceous deposit by thermally decomposing at least a portion of said hydrocarbonaceous deposit thereon in an atmosphere unreactive with said deposit at an elevated temperature below the deactivation temperature of said contact mass, contacting hydrocarbons under conversion conditions with at least a portion of said contact mass, which portion comprises substantially all of the hydrocarbonaceous deposit remaining thereon after said thermal decomposition and contacting at least a part of the contact mass with an oxidizing gas under combustion conditions to remove at least part of said hydrocarbonaceous deposit and to maintain the amount of said deposit on said contact mass below 100 grams of deposit per liter of contact mass.

6. In processes for the catalytic conversion of hydrocarbons wherein said hydrocarbons contact a refractory catalytic contact mass under conversion conditions and said contact mass concomitantly accumulates a hydrocarbonaceous deposit, which hydrocarbonaceous deposit substantially reduces the catalytic activity of said contact mass, the improvement which comprises substantially increasing the catalytic activity of a first part of said contact mass comprising said hydrocarbonaceous deposit by thermally decomposing at least a portion of said hydrocarbonaceous deposit in an atmosphere unreactive with said deposit at an elevated temperature below the deactivation temperature of said contact mass, contacting a second part of said contact mass comprising said hydrocarbonaceous deposit with an oxidizing gas under combustion conditions to remove at least part of said hydrocarbonaceous deposit, and contacting hydrocarbons under conversion conditions with a contact mass comprising said first part of said contact mass and said second part of said contact mass contacted with an oxidizing gas, said first part of said contact mass comprising substantially all of the hydrocarbonaceous deposit remaining thereon after said thermal decomposition.

7. In processes for the catalytic conversion of hydrocarbons wherein said hydrocarbons contact a refractory catalytic contact mass under conversion conditions and at temperatures below 1200° F. and said contact mass concomitantly accumulates a hydrocarbonaceous deposit, which hydrocarbonaceous deposit substantially reduces the catalytic activity of said contact mass, the improvement which comprises removing only a part of said deposit on said contact mass by combustion under conditions such that the temperature of the contact mass is raised by absorption of heat of combustion of the hydrocarbonaceous deposit, thermally treating at least a portion of the contact mass so raised in temperature in an atmosphere unreactive with said deposit at an elevated temperature above 1200° F., at which temperature pyrolysis of a minor portion of the hydrocarbonaceous deposit remaining after said combustion is effected and the catalytic activity of said contact mass is substantially increased, and subsequently contacting hydrocarbons under conversion conditions with said contact mass.

8. In processes for the catalytic conversion of hydrocarbons wherein said hydrocarbons contact a refractory catalytic contact mass under conversion conditions and said contact mass concomitantly accumulates a hydrocarbonaceous deposit, which hydrocarbonaceous deposit substantially reduces the catalytic activity of said contact mass, the improvement which comprises thermally treating said contact mass comprising said hydrocarbonaceous deposit in an atmosphere unreactive with said deposit at an elevated temperature above 1200° F., at which temperature pyrolysis of said hydrocarbonaceous deposit is effected and hydrogen-rich gases are formed, separating said hydrogen-rich gases from said thermally treated contact mass and subsequently contacting hydrocarbons under conversion conditions with said contact mass.

9. The improvement of claim 1 in which the catalytic conversion of hydrocarbons is effected under cracking conditions and in which the refractory catalytic contact mass comprises a cracking catalyst.

10. The improvement of claim 1 in which the catalytic conversion of hydrocarbons is effected under cracking conditions and in which the refractory catalytic contact mass comprises a siliceous cracking catalyst.

11. The improvement of claim 1 in which the catalytic conversion of hydrocarbons is effected under dehydrogenation conditions and the refractory catalytic contact mass comprises a dehydrogenation catalyst.

12. The improvement of claim 6 in which the catalytic conversion of hydrocarbons is effected under cracking conditions and the refractory catalytic contact mass comprises a cracking catalyst.

13. The improvement of claim 6 in which the catalytic conversion of hydrocarbons is effected under dehydrogenation conditions and the refractory catalytic contact mass comprises a dehydrogenation catalyst.

14. In a process for the catalytic conversion of hydrocarbons wherein said hydrocarbons contact a refractory catalytic contact mass under conversion conditions and said contact mass concomitantly accumulates a hydrocarbonaceous deposit, which hydrocarbonaceous deposit substantially reduces the catalytic activity of said contact mass, the improvement which comprises thermally decomposing at least a portion of said hydrocarbonaceous deposit thereon in an atmosphere unreactive with said deposit at an elevated temperature below the deactivation temperature of said contact mass, thereby substantially reducing the hydrogen content of said deposit, contacting hydrocarbons under conversion conditions with at least a portion of said contact mass, which portion comprises substantially all of the hydrocarbonaceous deposit remaining thereon after said thermal decomposition, and contacting at least a part of the contact mass with an oxidizing gas under combustion conditions to remove at least part of the deposit on said contact mass.

ROY W. HARKNESS.

REFERENCES CITED

The following references are of record in the file of this patent:

UNITED STATES PATENTS

| Number | Name | Date |
| --- | --- | --- |
| 2,290,580 | Degnen et al. | July 21, 1942 |
| 2,348,009 | Johnson et al. | May 2, 1944 |
| 2,385,326 | Bailey Jr. | Sept. 25, 1945 |
| 2,391,336 | Ogorzaly | Dec. 18, 1945 |
| 2,397,352 | Hemminger | Mar. 26, 1946 |
| 2,407,371 | Jahnig | Sept. 10, 1946 |
| 2,463,434 | Shankland | Mar. 1, 1949 |